3,260,786
HOUSING ARRANGEMENT FOR ELECTRICAL APPARATUS IN SUBMARINE CABLE INSTALLATIONS

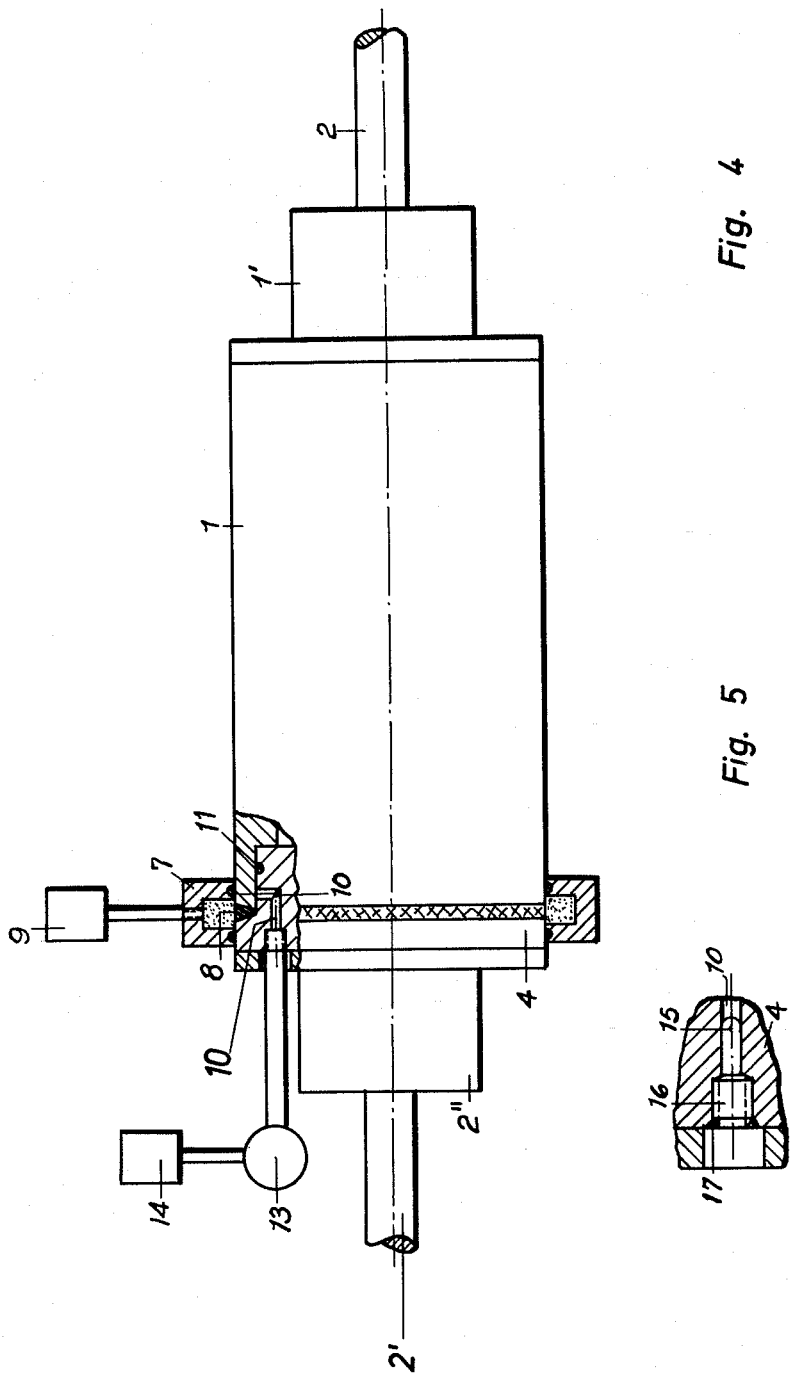

Wolfgang Katzschner, Cologne-Mulheim, Germany, assignor to Felten & Guilleaume Carlswerk Aktiengesellschaft, Cologne-Mulheim, Germany
Filed Aug. 9, 1963, Ser. No. 301,112
Claims priority, application Germany, Aug. 17, 1962, F 37,613
3 Claims. (Cl. 174—11)

This invention concerns submarine cable installations and more specifically a housing arrangement for water and pressure tightly enclosing an electrical apparatus to be connected as an intermediary member in a submarine cable installation.

When submarine communication cables are laid which contain at least in cable installations of substantial length a number of submarine repeater or amplifier stations, it cannot be avoided, as is well known, that unpredictable frequency distortions develop in the transmission of signals through such an installation. Therefore, such frequency distortions must be compensated by additionally equipping the cable installation with intermediary distortion correcting devices. Since of course the magnitude of such frequency distortions and their dependence on the signal frequencies used is not known beforehand and cannot be predetermined in any way, it was up to now necessary to carry aboard of the cable laying ship a plurality of types of intermediate distortion correcting devices corresponding to a plurality of different types of distortions so that according to need and requirements a suitable one of those intermediary distortion correcting devices could be selected and inserted into the cable.

As is well known, distortion correcting devices as well as the above mentioned submarine repeater or amplifier devices must be constructed with extreme care and accuracy both electrically and mechanically because any fault or failure thereof occurring after their installation under water could be removed or remedied only with extreme difficulties and at very high cost. Therefore, intermediary distortion correcting devices have been placed up to now at the factory into a tight housing and connected at either end with a short portion of the respective cable whereafter the closed housing containing the correction device was carefully tested for tightness and resistance to pressure.

In order to be able to compensate various types of frequency distortions in the above manner with maximum accuracy it was necessary to carry aboard a comparatively great number of completely finished manufactured and adjusted intermediary distortion correcting devices enclosed in water and pressure tight housings. However, of this great number of arrangements only a few could be expected to be used so that the system has been considered to be highly uneconomical. Therefore some methods of compensating frequency distortions have been proposed. For instance adjustable distortion correction devices are known which can be adjusted from the outside immediately before their installation. For this purpose a plurality of different distortion correcting units have been placed into one housing which already before its installation is connected at either end firmly with a portion of the respective cable. A selected one of the correction devices is then placed in circuit by suitable steps before the installation of the arrangement in the cable. Several ways have been proposed for selectively placing one or the other of the distortion correcting devices in circuit, e.g., by changing the orientation or position of the housing, i.e., with the aid of gravity, or by the application of control impulses impressed on a carrier frequency which is transmitted to the device through the above mentioned cable portions.

All these known devices and methods have been found very unsatisfactory. For instance, all those methods which rely on the application of gravity or of control pulses for selectively placing correcting devices in circuit are not as reliable as is necessary in view of the required high operational reliability of submarine cable connections. This is due to the fact that the quality of the electrical connections produced in this manner inside the housing of the correcting device installation cannot be supervised or inspected from the outside. In addition, it has to be borne in mind that a housing, the dimensions of which are for obvious reasons and in view of its use limited, can accommodate only a limited number of distortion correcting devices so that in many cases the various frequency distortions occurring in a submarine cable installation could not be compensated in the above-mentioned manner with sufficient accuracy.

It is therefore one object of this invention to provide for a housing arrangement and for a system of installation which avoids all the drawbacks of the conventional systems.

It is another object of this invention to provide for an arrangement of the type set forth which would make it possible that a desired type of distortion correcting device can be assembled aboard the cable laying ship from stock components immediately before it has been installed, i.e., after the required parameters have been determined by testing the cable and measuring the existing distortions, whereafter the thus specifically assembled or accordingly adjusted correction device can be enclosed in a tight housing.

Up to now it has been considered impossible to proceed in this manner because it was not known how to seal reliably the housing and how to test the tightness of the sealed housing before this housing is made a part of the submarine installation. There were not believed to be available facilities for doing the above aboard the cable laying ship.

Against this background the invention provides for a housing arrangement which can be tightly sealed immediately before its installation and which can be tested for its tightness aboard the cable laying ship.

With above objects in view, the invention includes a housing arrangement:

(a) For water and pressure tightly enclosing an electrical apparatus to be connected as an intermediary member in a submarine cable installation, comprising, in combination, a first preassembly including a housing body portion and a portion of a first submarine cable introduced into the interior of said body portion through one of its walls and sealed and anchored therein, said housing body portion having one open end portion of predetermined shape and dimensions and bounded by a rim portion;

(b) And a second preassembly including a housing lid portion and a portion of a second submarine cable passed through said lid portion from the outer side to the inner side thereof and sealed and anchored therein, said lid portion having an inwardly projecting portion shaped and dimensioned so as to fit substantially tightly into said open end portion of said housing body portion, and a lid rim portion adjacent to said projecting portion, said lid rim portion facing said rim portion of said housing body portion when said lid portion is positioned with its projecting portion inserted into said open end portion of said housing body portion, said rim portions being shaped in such a manner that when said lid portion is so positioned said rim portions can be joined tightly by a welding seam.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 4 is an elevation of the assembly shown by FIG. 3 illustrating additionally the means for carrying out the test for tightness after assembly; and FIG. 5 is a partial sectional view of the arrangement shown by FIG. 4 and illustrates means for finally and definitely closing the housing after carrying out the tightness test.

Figure 1:
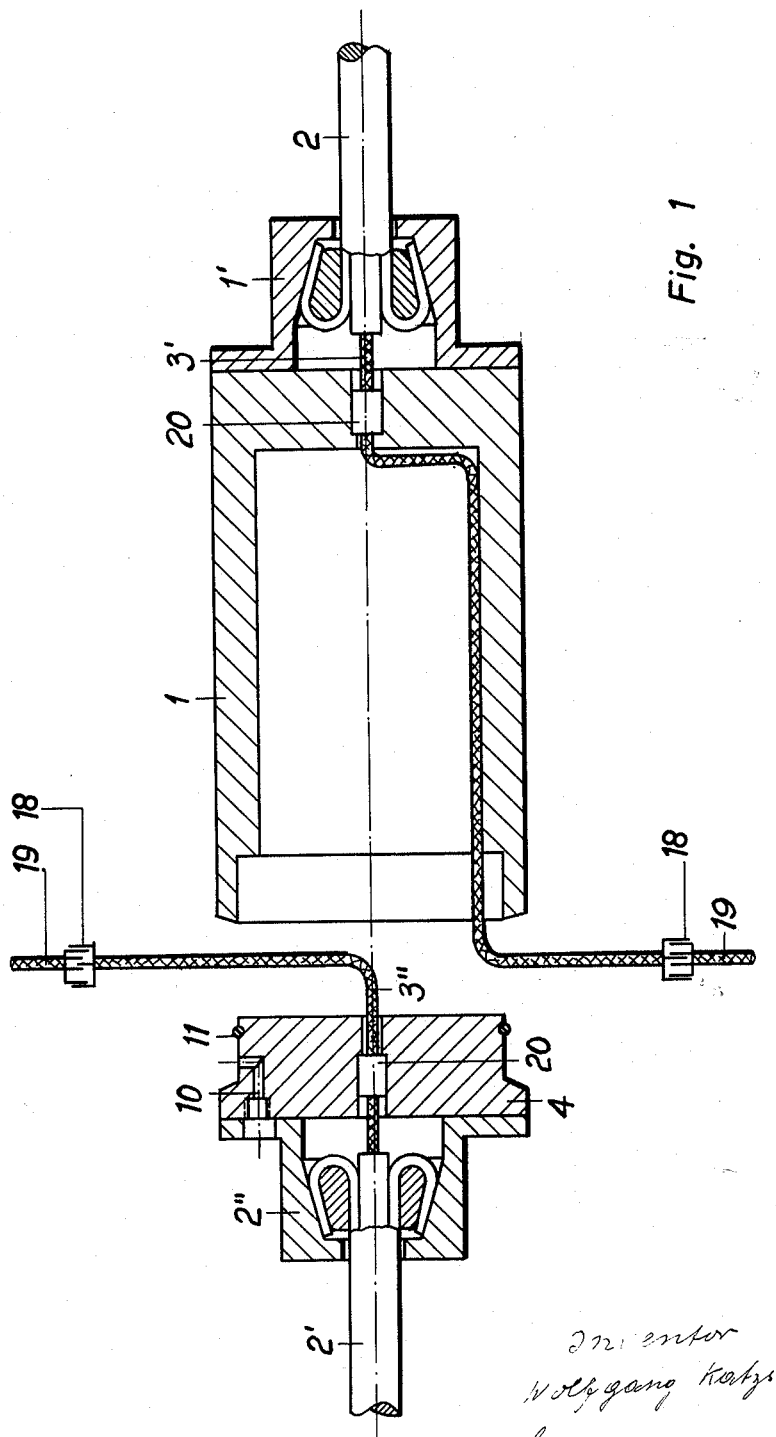
FIG. 1 illustrates diagrammatically in axial cross section two sub-assemblies which, when assembled, constitute a housing arrangement according to the invention.

As can be seen from FIG. 1 the housing arrangement according to the invention comprises a first free assembly including a housing body portion 1 and a portion of a submarine cable 2 introduced into the interior of the housing body portion and sealed and anchored therein in the manner shown at 1'. This sub-assembly is factory tested for water and pressure tightness. The second sub-assembly shown by FIG. 1 includes a lid portion 4 and a second portion 2' of the respective submarine cable which is also sealed and anchored in the lid portion 4 as shown at 2". Also this sub-assembly is factory tested for water and pressure tightness. The conductive members 3' of the cable portion 2 as well as the conductive members 3' of the other cable portion 2' are passed through the interior of the housing body portion 1 and through the body of the lid portion 4, respectively, as shown. The ends of the conductive members 3' and 3" are provided with connectors or contacts 18 which may be connected quickly and reliably, e.g. by plug connections or by soldering, with test lines 19. When in the course of laying the cable for instance the cable portion 2 and/or the cable portion 2' have been spliced with the already laid cable, signals can be transmitted through the installation and the occurring distortions can be measured by using the above-mentioned test connections 19. On the basis of the results of these measurements and tests the suitable distortion correcting device is selected or assembled or adjusted and placed into the housing body portion 1.

It should be noted that the lid portion 4 is provided with a test duct 10 extending from the outside to the circumference or surface of an inwardly projecting portion of the lid 4 which portion is designed to fit substantially tightly in the corerspondingly shaped and dimensioned open end portion of the housing body 1. The open end of the housing body 1 is bounded by a rim portion which, when the lid portion 4 is inserted into the open end of the body 1, faces a corresponding rim portion adjacent to the above-mentioned projecting portion of the lid 4.

Figure 2:
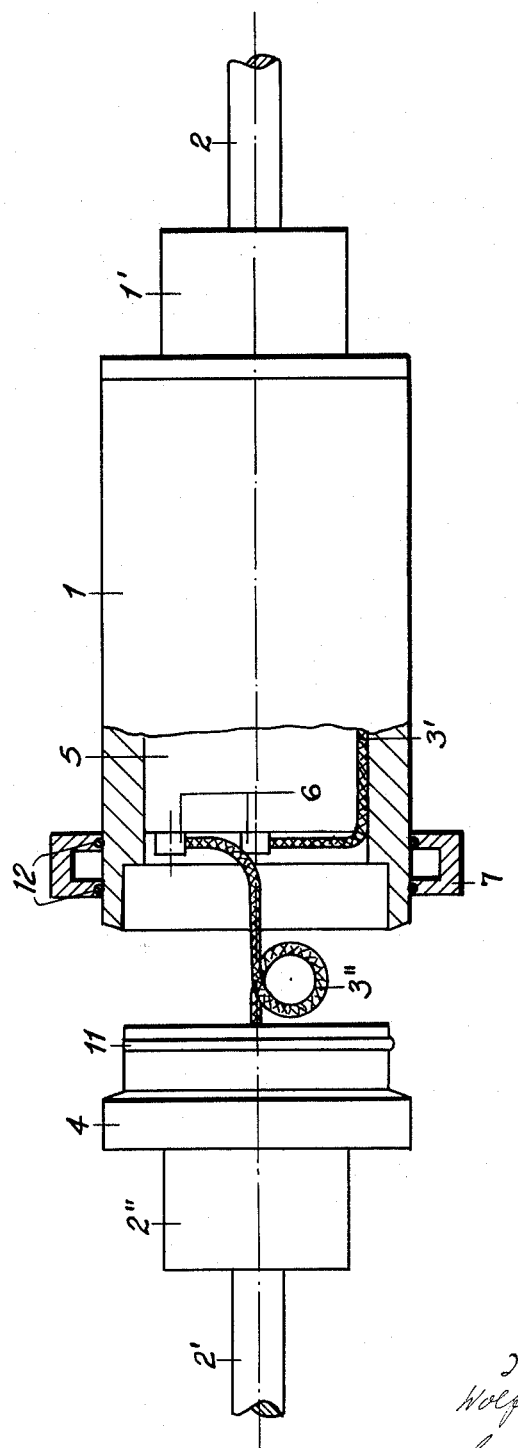
FIG. 2 is a similar illustration of the same sub-assemblies, only partly in axial section, illustrating an intermediate stage of the assembly procedure.

FIG. 2 illustrates an intermediate stage of the assembly operation. As can be seen the actual distortion correcting device 5 has been placed into the inside of the housing body portion 1 and the conductive members 3' and 3" of the cable portions 2 and 2', respectively, have been connected with the corresponding terminals 6 of the device 5. Now the lid portion 4 is ready for being inserted with its projecting portion into the open end of the housing body 1 so as to fit substantially tightly into that open end. The tightness is improved by providing on the above-mentioned projecting portion of the lid 4 a groove receiving a sealing ring 11 of circular cross section.

For the purpose of carrying out a pressure test as described further, below, a pressure transfer member 7 has been positioned on the outside of the housing body portion 1 as shown, this member consisting of a channel-shaped annular member the interior of which faces the circumference of the body 1, with sealing rings 12 preferably arranged as shown for sealing the interior of the annular member 7 against the surrounding air.

Figure 3:
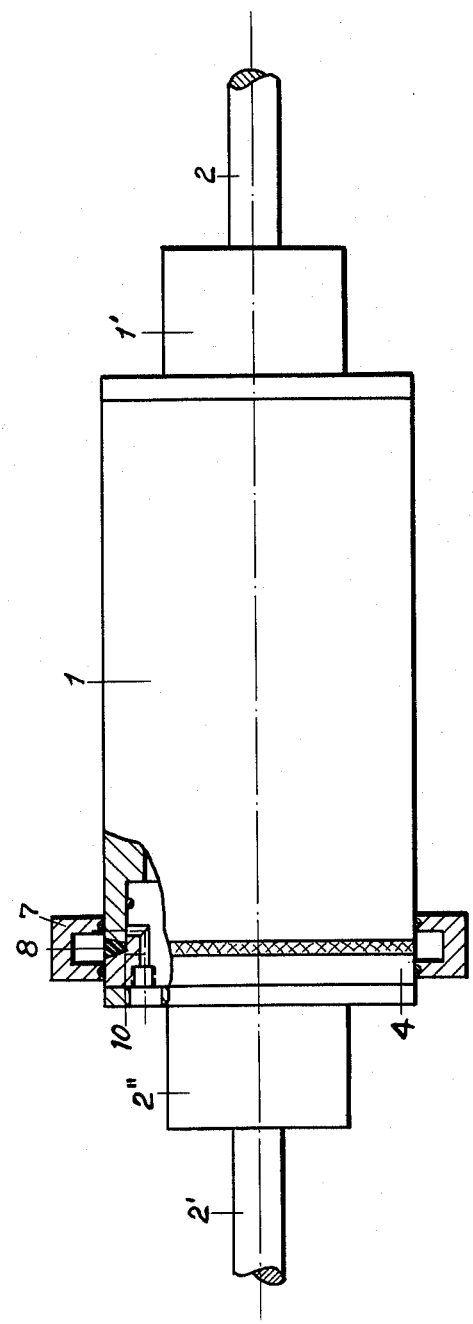
FIG. 3 is an elevation of the assembled housing arrangement, partly in section and illustrating also a pressure test member applied to the outside of the housing assembly.

FIG. 3 illustrates the next step. After the lid portion 4 has been inserted with its projecting portion into the open end of the body 1 the space between the two rim portions facing each other and being preferably V-shaped has been filled by a welding seam 8 which tightly joins the two rim portions and thereby the body portion 1 with the lid portion 4. After the welding operation has been completed the pressure test member 7 is moved in the position shown by FIG. 3 in which its interior straddles the above-mentioned welding seam 8. As shown by FIG. 4 the tightness test is now carried out in the following manner. With the aid of a conventional pump 9 connected with the interior of the annular member 7 a pressure fluid (gas or liquid) is applied to the welding seam 8 through the interior of the annular member 7. This pressure may be of the order of 1,000 p.s.i. At the same time or immediately thereafter suction is applied by means of a vacuum pump 13 through the duct 10 in the lid portion 4 to the interior of the assembly or rather more specifically to the area surrounding the circumferential surface of the projecting portion of the lid 4 near the welding seam 8. Whatever the vacuum pump 13 removes by suction from the inner space of the assembly is delivered to a testing device 14. If it is found that traces of the pressure fluid applied to the outside of the weld 8 are removed by suction then this would prove that the welded housing assembly is not as tight as required. On the other hand if no traces of the pressure fluid are removed by suction this would indicate that the desired tightness has not been achieved.

Thus, if the pressure test has been satisfactorily completed the annular members 7 can be removed and also the vacuum pump 13 is disconnected from the duct 10 in the lid portion 4. Thereafter the duct 10 is permanently and tightly closed as illustrated by FIG. 5. First a conical steel pin 15 is driven into the actual duct 10 and thereafter a cylindrical plug 16 is placed into the corerspondingly dimensioned outer end of the duct 10. Finally this plug 16 is tightly joined at its outer edge with the lid 4 by a welding seam 17. In this manner the last remaining access to the interior of the housing arrangement is safely closed. For maximum security the welding seam 17 is carefully inspected in a well known manner in order to find whether this weld contains any cracks.

As can be seen in accordance with the invention the housing arrangement is so constructed that all critical components as for instance the body portion and the lid portion including the means for introducing and attaching the cable portions can be carefully and reliably tested for tightness already at the factory. Thus there remains only one place which has to be closed and tested aboard the cable laying ship and that is the area of the welding seam 8. However, it has been shown above that this welding seam can be produced with simple means and without any difficulty and in the same manner, the tightness of this welding connection can be tested aboard ship with comparatively simple means. The sealing ring 11 is added for additional safety.

The closing of the duct 10 by the conical pin 15 is in itself a highly reliable means for closing the duct. The security of this closure is increased by the addition of the cylindrical plug 16 which is additionally welded to the lid portion 4 by a welding seam which may be additionally tested for its freedom of cracks.

Thus, the object of the invention is satisfactorily achieved because in the manner described a possibility has been shown for safely, rapidly and economically closing a housing for electrical apparatus e.g. for distortion correcting devices immediately before the installation of such a device in a submarine cable.

It will be understood that each of the elements described above or two or more together, may also find a useful application in other types of a housing arrangement for closing an electrical apparatus in a submarine cable installation and a method for assembling the housing arrangement differing from the types described above.

While the invention has been illustrated and described as embodied in a housing arrangement for enclosing an electrical apparatus in a submarine cable installation and sealed by a single welding seam, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A housing arrangement for water and pressure tightly enclosing an electrical apparatus to be connected as an intermediary member in a submarine cable installation and apparatus for testing the tightness of the arrangement, comprising, in combination, a first preassembly including a housing body having one open end and being closed on the other end thereof and a portion of a first submarine cable introduced into the interior of said body through one of its walls and sealed and anchored therein, said one open end being of predetermined shape and dimensions and bounded by a rim portion; a second preassembly including a housing lid and a portion of a second submarine cable passed through said lid from the outer side to the inner side thereof and sealed and anchored therein, said lid having an inwardly projecting portion shaped and dimensioned so as to fit substantially tightly into said open end of said housing body, and a lid rim portion adjacent to said projecting portion, said projecting portion being inserted into said open end of said housing body, said lid rim portion facing said rim portion of said housing body and said rim portions being joined by a single circumferential weld seam, said lid being further provided with a duct extending from said outer side thereof to a surface of said projecting portion, said duct being adapted to be used for testing the tightness of the housing arrangement; a movable channel-shape annular member fitting substantially tightly over both said rim portions in a position in which the interior of said annular member straddles said single circumferential weld seam, said annular member having an inlet opening for introducing a pressure fluid into said interior thereof; pressure means for applying outside pressure to said weld seam by introduction of a pressure fluid into said annular member; and suction means for applying suction to the interior of the housing arrangement through said duct in said lid thereof, so that lack of said pressure fluid being removed by said suction means indicates tightness of said housing arrangement.

2. A housing arrangement for water and pressure tightly enclosing an electrical apparatus to be connected as an intermediary member in a submarine cable installation, comprising, in combination, a first preassembly including a cup-shaped housing body having one open end bounded by a rim portion and being closed on the other end thereof and a portion of a first submarine cable introduced into the interior of said housing body through one of its walls and sealed and anchored therein; a second preassembly including a housing lid and a portion of a second submarine cable passed through said lid from the outer side to the inner side thereof and sealed and anchored therein, said lid having an inwardly projecting portion substantially tightly fitted into said open end of said housing and a lid rim portion adjacent to said projecting portion and facing said rim portion of said housing body; said housing lid being further provided with a duct extending from the outer side thereof to the surface of said projecting portion, said duct being adapted to be used for testing of the tightness of the housing arrangement; an electrical apparatus located inside said housing body and connected to said first and said second submarine cable; a single circumferential weld seam located between said housing body rim portion and said lid rim portion and tightly sealing said lid to said housing body; a movable channel-shaped annular member fitting substantially tightly over both said rim portions in a position in which the interior of said annular member straddles said weld seam, said annular member having an inlet opening for introducing a pressure fluid into said interior thereof; means for introducing a pressure fluid into said annular member so as to apply pressure to said weld seam; and suction means for applying suction through said duct in said lid so that lack of said pressure fluid being removed by said suction means indicates tightness of said housing arrangement.

3. A housing arrangement as set forth in claim 2 also comprising a groove and a sealing ring received therein, said groove and said ring being located on said inwardly projecting portion of said lid inward of said duct for preventing said pressure fluid to come into contact with said electrical apparatus even if said pressure fluid should pass said weld seam.

References Cited by the Examiner
UNITED STATES PATENTS

| | | | |
|---|---|---|---|
| 2,697,739 | 12/1954 | Presswell | 174—70 |
| 2,703,978 | 3/1955 | Baxter. | |
| 2,938,067 | 5/1960 | Werner | 174—70 |
| 2,945,914 | 7/1960 | Aamodt | 174—50.56 |

LARAMIE E. ASKIN, *Primary Examiner.*

DARRELL L. CLAY, ROBERT K. SCHAEFER,
*Examiners.*